Feb. 9, 1937.　　J. M. BURGESS　　2,070,113
MOTOR VEHICLE
Filed June 12, 1934　　2 Sheets-Sheet 1
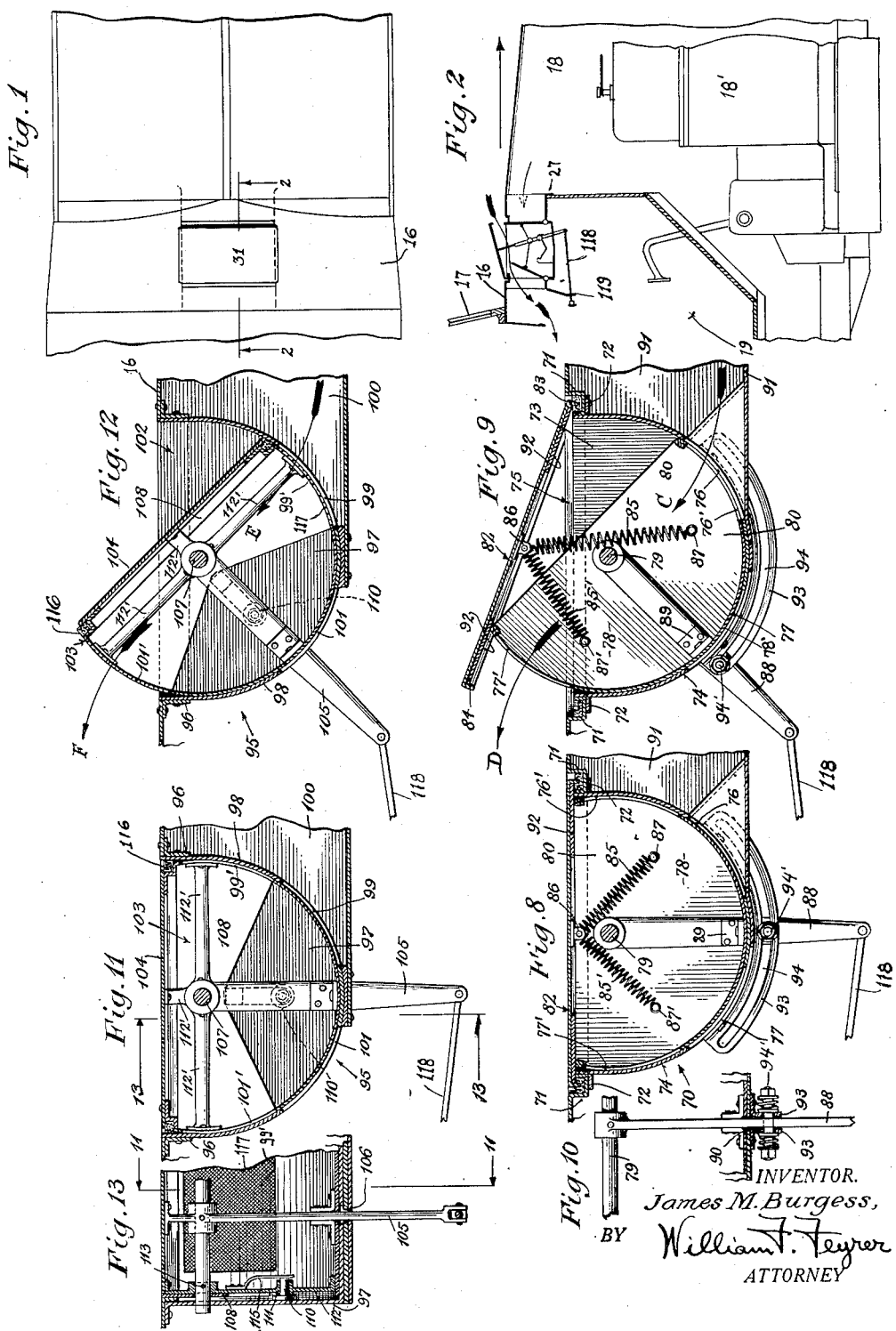
INVENTOR.
James M. Burgess,
BY William T. Feyrer
ATTORNEY Feb. 9, 1937.   J. M. BURGESS   2,070,113
MOTOR VEHICLE
Filed June 12, 1934   2 Sheets-Sheet 2
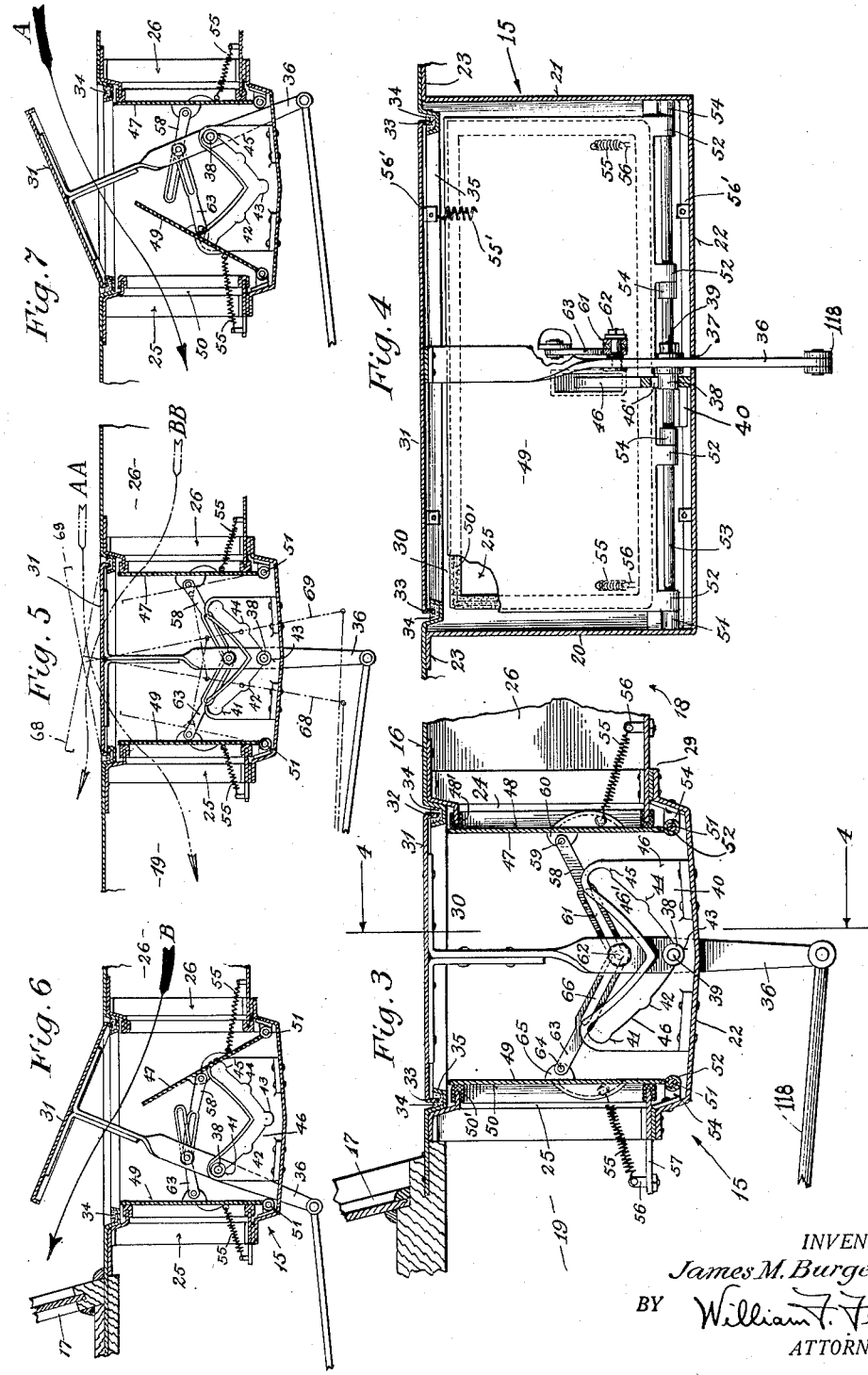
INVENTOR:
James M. Burgess,
BY William F. Feyrer
ATTORNEY Patented Feb. 9, 1937

2,070,113

UNITED STATES PATENT OFFICE 2,070,113

MOTOR VEHICLE

James Milford Burgess, Norwalk, Conn.

Application June 12, 1934, Serial No. 730,285

20 Claims. (Cl. 98—2)

This invention relates to motor vehicles, and particularly to combined defrosting and ventilating devices for automobiles and motor trucks.

While driving and riding in motor vehicles two very important problems arise very often. One problem is to keep the windshield free of sleet and frost during winter driving so that the line of vision of the driver and other occupants is not impaired, and the other problem is to ventilate the passenger compartment for comfort.

Heretofore there have been a number of developments to master one or the other of these problems, and a few efforts to provide a combination device to master both. Most of these proposals embrace very complicated mechanisms and require separate cowl openings and covers for defrosting and for ventilating. So far as applicant is aware no commercially satisfactory combination defroster and ventilator has been provided, and especially none with a simple control and single cover adapted to direct exterior air into the vehicle and interior heated air out of the vehicle.

It is an object of the present invention to provide a simple and highly efficient apparatus for collecting hot air from the engine chamber and directing it against the windshield for defrosting purposes.

It is another object of the present invention to provide a combined windshield defroster and passenger compartment ventilator with a simple control, which may be made in the form of an attachment to be added to existing vehicles, or which may be built integral with the vehicle at the time of its manufacture.

It is an object of the present invention to provide a simpler, sightlier, and more efficient ventilating and defrosting apparatus than those heretofore proposed.

Features of the present invention include the provision of a combination device including the need of but a single opening, and a single cover therefor, capable with associated parts of directing a flow of warm air from within the vehicle upwardly and outwardly against a windshield, or to direct air from an exterior position down into the passenger compartment.

Other features of the present invention include the provision of an integral control member and top cover; a control lever directly associated with the control member to operate it without the need or use of interponents; mechanism for locating a control valve and cover in predetermined stepped positions; screens to prevent undesirable matter to pass into either the control chamber or the passenger compartment; and novel holding arrangements adapted to secure the valve and cover in any one of a vast number of positions.

Other objects, features, and advantages will be apparent to those skilled in the art and others will appear hereinafter. The present preferred embodiments of the invention are illustrated in the accompanying drawings, in which:

Figure 1 is a fragmentary top view of a vehicle showing the present invention thereon.

Fig. 2 is a sectional view of the first form of the invention, taken on line 2—2 in Fig. 1.

Fig. 3 is an enlarged sectional view of that form of the invention, shown in Fig. 2, with the parts in neutral position.

Fig. 4 is a sectional view taken on line 4—4 in Fig. 3.

Fig. 5 is a view similar to Fig. 3, on a reduced scale, showing the parts in the neutral or closed position, and showing the various operating positions diagrammatically.

Fig. 6 is a view similar to Fig. 5 but shows the parts in the defrosting position.

Fig. 7 is a view similar to Figs. 5 and 6 but shows the parts in ventilating position.

Figs. 8, 9, and 10 disclose a modified form of the present invention and of these figures:—

Fig. 8 is a cross section view taken substantially through the center, and shows the control parts in the intermediate or neutral positions.

Fig. 9 is a sectional view similar to Fig. 8 but shows the parts in the open defrosting position.

Fig. 10 is a detail of the holding mechanism.

Figs. 11 through 13 disclose a further modified form of the present invention, and of these:

Fig. 11 is a sectional view taken on line 11—11 in Fig. 13, and shows the main control member in closed position.

Fig. 12 is a view similar to Fig. 11, showing the same parts in the open defrosting position.

Fig. 13 is a sectional view taken on line 13—13 in Fig. 11.

Referring now in detail to the drawings, the first form of the invention shown in Figs. 1 through 7 comprises a control chamber 15 on the cowl 16 of a passenger motor vehicle below a windshield 17 and intermediate an engine chamber 18 and passenger compartment 19. The control chamber has side walls 20 and 21 connected together with an integral bottom 22, and has turned ears 23 for welding or otherwise securing it to the cowl. The front of the control chamber is left open to provide an inlet port 24, and the back thereof is open to provide an outlet port 25. A duct 26 may, as shown, be made integral with the side walls 20 and 21 and bottom wall 22 to conduct heated air overlying the engine 18' in the chamber 18 rearwardly into the control chamber. If preferred, this duct may be in the form of a separate channel secured with screws 27 to a regular dividing wall 28 in the vehicle and simply rest upon a shelf 29 portion of the control chamber. Preferably, however, the duct is made integral with the control chamber.

The control chamber 15 may be built in sizes to correspond with a louvre opening 30 in vehicles already in use, or it may be specially proportioned for new vehicles being made in the factory. This opening is closed with a louvre 31 having down-turned edges 32 and 33 engaging with a gasket 34 nesting with a channel 35 to permit tilting the louvre into the positions shown in Figs. 6 and 7, for example. Normally the louvre is in the closed position shown in Figs. 3, 4, and 5. However, a control lever 36 connected thereto and extending through a slot 37 in the bottom 22 is provided to move it into its various positions while a roller 38, secured to the lever as by a stud 39, riding in a block 40 may engage with any one of the notches 41, 42, 43, 44, or 45 in the lower wall 46 of a channel 46' to hold the louvre in predetermined closed, intermediate and opened positions.

Complete closing of the control chamber 15 is, according to the present invention, accomplished by the provision of a front gate 47 adapted to move against a seat 48 of the inlet port 24, and a back gate 49 adapted to move against a seat 50 of the outlet port 25. Preferably the seats 48 and 50 are in the form of sheet metal straps secured to the control chamber 15 and are provided with U-shaped rubber channels 48' and 50' to prevent rattle of the gate on the seat and to make the gates substantially air tight in the closed positions. Preferably the gates 47 and 49 are pivotally mounted on the bottom wall 22 by pintle hinges 51. Each of these hinges may be economically made by simply curling integral ears 52 around rods 53 extending between the side walls 20 and 21, and may be located relative to the latter by spacing collars 54.

Springs 55 secured to studs 56 on the duct 26 and plate 57 normally pull the gates 47 and 49 into the closed position shown in Figs. 3 and 5, and if preferred, springs 55' secured to studs 56' may be provided to pull the louvre 31 into the channel 34 and the roller 38 into the notches 41—45.

The present invention provides a very novel mechanism adapted to open the gate 49 of the outlet port when the louvre 31 is tilted to the position shown in Fig. 7, then to again close this gate and open the gate 47 to the inlet port 24 when the louvre is tilted into the position shown in Fig. 6. This mechanism comprises a link 58, connected by a stud 59 to a struck up ear 60 on the front gate 47, and through an apertured slot 61 connected to a stud 62 on the control lever 36 together with a similar link 63 connected with a pin 64 on an ear 65 portion of the back gate and through an elongated slot 66 is also connected to the stud 62 on the control lever.

When the main control lever 36 is moved forwardly into the position shown in Fig. 7, the louvre 31 is pivotally moved about the edge 33 to a raised position, and concurrently the link 63 pulls the gate 49 in a clockwise direction about the hinge 51. This gate and the louvre are supported in the open position by the roller 38 engaging in the notch 45 whereupon cool air may flow from the exterior of the car in the direction of the arrow A, Fig. 7, under the louvre and into the control chamber, thence through the outlet port 25 to ventilate the passenger compartment. In this operation the stud 62 rides rearwardly in the slot 61 of the link 58 ineffectively, thus keeping the gate 47 closed and preventing the passage of warm air from the engine chamber.

However, when the lever 36 is pulled back into the position shown in Fig. 6 to pivotally move the louvre about the edge 32, the link 58 pulls the front gate 47 into open position and allows heated air to pass from the engine chamber 18 rearwardly through the duct 26 into the control chamber 15, thence upwardly over the cowl 16 against the windshield 17 as indicated by the arrow B in Fig. 6, for defrosting. The louvre 31 and gate 49 are supported in this full open position by the roller 38 engaging the notch 41. During this operation the stud 62 ineffectively rides rearwardly in the slot 66 and thus does not move the gate 49 so that the latter prevents warm air in the chamber 15 from entering the passenger compartment.

An intermediate defrosting condition is also obtained by moving the control lever 36 into the dot-and-dash line position shown at 68, with the roller 38 in the notch 42, whereupon the louvre 31 is in the dot-and-dash line position, shown in Fig. 5, and heated air flows in the direction of the arrow BB.

Also, an intermediate ventilating condition is obtained by moving the control lever forwardly into the double-dot-and-dash line position shown at 69, when the louvre 31 will be in the double dot-and-dash line position whereupon cool air will flow in the direction of the double dot-and-dash arrow AA.

Figs. 8, 9, and 10 show a modified form of the invention, which has the advantage of being more simple and more economical to construct and of being more readily applied to vehicles already in use than the first form of the invention.

This modified form comprises a control chamber 70 of semi-circular shape secured to a louvre channel 71 by ears 72, and having end walls 73 with only one intermediate wall or bottom 74. The control chamber thus formed is provided with a top opening 75 and two bottom openings including an inlet port 76 and outlet port 77.

A member 78 is supported within the control chamber 70 for oscillatory movement either by the chamber itself or by a rod 79 secured to end walls 80 thereof and pivoted in the side walls 73 of the chamber. This member is provided with a pair of openings 76' and 77' adapted to align with the inlet and outlet ports 76 and 77 respectively at predetermined times.

A louvre 82 having downturned edges 83 and 84 engaging in the louvre channel 71 for pivotal movement is provided to close the top opening 75 of the control chamber. Full closing of the control chamber is effected by moving the member 78 into the position shown in Fig. 8, whereupon the openings 76' and 77' are closed by the intermediate wall 74 and the top opening is fully closed by the louvre 82, the latter being held in the closed position by a pair of springs 85 and 85' secured at one of their ends to a bracket 86 centrally of the louvre 82, and on studs 87 and 87' at their other ends. A control lever 88 on the rod 79 and secured to the member 78 by a bracket 89 and extending through a slot 90 is provided to oscillate the control member 78 into the defrosting position shown in Fig. 9 when the lever 88 is pulled rearwardly. During this movement a rear edge on the member 78 lifts the back of the louvre to pivot the louvre on the edge 83 as shown in Fig. 9. In the latter position the inlet port 76 and opening 76' align to permit hot air to pass from the duct 91 through the control chamber in the direction of the arrows C and D outwardly thereof through the opening 77' against the windshield.

The louvre 82 is held firmly in engagement with the member 78 by the spring 85 as is immediately apparent by viewing Fig. 9. In this position it should be noted that a wall 78' of the member 78 fully closes the outlet port 77, and thus prevents the passage of warm air or gases from the chamber 70 into the passenger compartment.

The lever 88 may also be used to move the member 78 in an anti-clockwise direction from the neutral position shown in Fig. 8, substantially the same extent as the clockwise movement just described, whereupon the front edge member 78 engages the front portion of the louvre to lift one side out of the channel 71 while the louvre pivots on the edge 84. In this position the opening 76' allows air to pass from over the hood down into the control chamber 70 thence through the opening 77' and outlet port 77 into the passenger compartment, and the spring 85' is tensioned to hold the front of the louvre 82 against the member 78.

A strip of fiber 92, glued or otherwise secured to the louvre, provides an anti-friction and anti-rattle medium between the louvre 82 and the upper edges of the member 78.

Novel means is provided by the present invention to hold the control member 78 and associated parts in the full open defrosting, the full open ventilating, or the neutral positions just described, and in any intermediate stations. This mechanism comprises angle plates 93 secured to the intermediate wall 74 and provided with an elongated slot 94 and a friction stud 94' (see Fig. 10) adapted to ride upon and grip the angular plates sufficiently to hold the member 78 in any desired position.

In Figs. 11 through 13 there is shown an even more simplified form of the present invention.

This form of the invention comprises a control chamber 95 of semi-cylindrical form which may be secured to the cowl as by brackets 96. This control chamber has end walls 97 and an intermediate wall 98, the latter being provided with an inlet port 99 connecting with a duct 100 extending to the engine chamber and having an outlet port 101 communicating with the passenger compartment. A single large top opening 102 forms a part of the control chamber.

An oscillating member 103 pivoted on a rod 107 within the semi-circular control chamber 95 is capable of movement from the neutral position shown in Fig. 11 to the clockwise, defrosting position shown in Fig. 12, and substantially and equally arcuate extent from the neutral position in a counter-clockwise direction to a ventilating position.

This member 103 is a very advantageous structure, for a cover 104 may be made integral therewith and thereby absolutely prevent rattle. It is provided with openings 99' and 101' normally closed by the wall 98 when the member 103 is in the neutral position shown in Fig. 11. However, these openings may be aligned with ports 99 and 101 for defrosting and ventilating.

Such conditioning is effected by a control lever 105 extending through an aperture 106 upwardly to be secured to the cross rod 107, the latter being secured to end walls 108 of the member 103 and pivoted in the end walls 97 of the chamber 95.

When the lever 105 is pulled rearwardly in a clockwise direction to the end of the slot 106, the opening 99' aligns with the inlet port 99 to allow heated air to pass from the engine chamber 18 through the duct 100 thence through the control chamber 95 upwardly and outwardly through the opening 101' in the direction of the arrows E and F against the windshield to defrost.

The lever 105 may also be moved from the neutral position in a counterclockwise direction an equal extent, whereupon the opening 99' overlies the cowl 16, and the opening 101' aligns with the outlet port 101 to direct air into the chamber 95, thence into the passenger compartment.

A gasket 116 is carried by the control member 103 to prevent water from seeping into the control chamber 95 when the parts are in the neutral position and to closely wipe the chamber 95 when the control member is moved from either the defrosting or the ventilating position into the neutral position.

A novel frictional holding means is shown with this form of the invention comprising a spring plunger slidably mounted in a bearing 111 portion on a bar 112 secured to the rod 107 as by a pin 113. Preferably this bar 112 is made in the form of a spider with other arms 112' extending to the side walls of the member 103 and to the cover 104 to provide an additional support and strengthening medium. A flat spring 115 pushes against the pin 110 to force it frictionally into engagement with the end wall 97 and thereby holds the member 103 in any desired arcuate position.

The present invention also provides a screen adapted to prevent insects and other undesirable objects from passing to the passenger compartment 19 through the control chamber 95 from over the cowl 15 or to prevent passage of undesirable matter to the control chamber from the engine chamber 18. In its simplest form this comprises a screen 117, as shown in Fig. 13 particularly, of any desired mesh soldered or otherwise secured to the side walls of the opening 99'. If preferred a similar screen may be secured in the opening 101' or to other forms of the invention.

The control levers 36, 88, and 105 of the various forms of the present invention may be used directly as a hand lever, or may be provided with a link system 118 extending to the instrument board 119, or some other advantageous location for control.

Although the present invention is shown as only one, applied near the center of the cowl 16 of a passenger car, it will be readily appreciated that two may be applied equally well to the cowl, or that the devices may be used on motor trucks and other types of vehicles.

Other variations and modifications may be made within the scope of this invention and portions of the improvements may be used without others.

Having thus explained the nature of this invention and described a way of constructing and using the same, although without attempting to set forth all of the forms in which it may be made, or all of the modes of its use, I claim:

1. A combination ventilator and defroster for vehicles, comprising a control chamber with only three openings, including two bottom openings and only one top opening; means cooperating with said control chamber and openings adapted to selectively close all of said openings simultaneously, form one air passage between one bottom opening and the top opening and form a second air passage between the other bottom opening and the top opening; and only one operating lever adapted to variously condition said means.

2. A combination ventilator and defroster, for vehicles having an engine chamber, passenger compartment, and windshield, comprising a control chamber having a pair of openings communicating with the passenger compartment and with the engine chamber, and having only one top opening; only one top cover for the opening; means adapted to coordinately open and close said pair of openings and to condition the one top cover in neutral, ventilating and defrosting positions; and friction means adapted to hold the last named means in divers positions.

3. A combination ventilator and defroster for vehicles having an engine chamber, windshield, and a passenger compartment, comprising a control chamber having a pair of openings communicating with the passenger compartment and with the engine chamber; a pair of gates for conditioning said openings; only one top cover for said control chamber cooperating with said pair of gates to ventilate the compartment and to defrost the windshield; and means inter-connecting said gates and said cover for effecting coordinate operation thereof.

4. A combination ventilator and defroster for vehicles having an engine chamber, windshield, and a passenger compartment, comprising a control chamber having a pair of lower openings communicating with the passenger compartment and with the engine chamber and a top opening; a pair of gates for conditioning said openings; a top cover for the top opening of said control chamber cooperating with said pair of gates to ventilate the compartment and to defrost the windshield; and means, including only one handle adapted to automatically and coordinately condition said gates and said top cover.

5. A combination ventilator and defroster, for use in automobiles having an engine chamber, cowl, passenger compartment and windshield, comprising a control chamber having a top opening; a duct for warm air leading from the engine chamber to the control chamber; a pair of gates in said control chamber; only one cover for the top opening; a shifting lever having two tilt and one intermediate position; and connections between said gates, cover, and lever adapted to close both gates and the cover when the shifting lever is in the intermediate position, and to open the top cover and a predetermined one of the gates when the lever is moved to either of the tilt positions thereby to form a warm air passage from the duct upwardly through the control chamber against the windshield when moved to one tilt position, and to form a cold air passage from the exterior of the automobile downwardly through the control chamber to the passenger compartment when moved to the other tilt position.

6. A combination ventilator and defroster for vehicles having an engine chamber, windshield, and a passenger compartment, comprising a control chamber having a pair of openings communicating with the passenger compartment and with the engine chamber; a pair of gates for conditioning said openings; only one top cover for said control chamber cooperating with said pair of gates to ventilate the compartment and to defrost the windshield; and links interconnecting and effecting coordinate movement between said gates and said top cover.

7. A combination ventilator and defroster for vehicles having an engine chamber, windshield, and a passenger compartment, comprising a control chamber having a pair of lower openings communicating with the passenger compartment and with the engine chamber and having a top opening; a pair of gates for conditioning said openings; only one top cover for the top opening of said control chamber cooperating with said pair of gates to ventilate the compartment and to defrost the windshield; and means including interconnecting links and only one control handle adapted to coordinately condition said gates and said top cover.

8. In a combination ventilator and defroster for vehicles having an engine chamber, cowl, passenger compartment and windshield, the combination of a control chamber having two bottom openings and only one top opening; a duct for warm air leading from the engine chamber to the control chamber; and only one member in said control chamber, for conditioning said two bottom openings and one top opening, adapted to direct the flow of warm air from the duct through the control chamber then upwardly relative to the cowl and against the windshield in one of its positions, and to direct air from exteriorly of the cowl into the control chamber thence into the passenger compartment in another of its positions.

9. In a combination ventilator and defroster for vehicles having an engine chamber, cowl, passenger compartment, and windshield, the combination of a control chamber having only one top and two bottom openings; a duct for warm air leading from the engine chamber to the bottom opening in the control chamber; and only one member in said control chamber having two openings therein and having two tilted and one intermediate position, adapted to fully close both the bottom and top openings in the control chamber when in the intermediate position, to pass warm air from the duct upwardly across the cowl against the windshield in one tilting position, and to direct exterior air from the cowl directly through the control chamber to the passenger compartment in another tilting position.

10. A combination ventilator and defroster for vehicles having an engine chamber, windshield and a passenger compartment, comprising a control chamber having a pair of lower openings communicating with the engine chamber and with the passenger compartment and only one top opening; a cross rod extending axially through said control chamber; and only one member pivotally mounted on the cross rod adapted to alternately close all of said openings and to open predetermined openings to effect a defrosting and a ventilating condition.

11. A defroster for vehicles having an engine chamber, cowl and windshield, comprising a control chamber having a lower opening communicating with the engine chamber and having a top opening; and only one member oscillatably mounted in said control chamber adapted in one position to close all of said openings and in another position open certain of said openings and in the latter condition to direct warm air from the engine chamber over the cowl and against the windshield.

12. A defroster for vehicles having an engine chamber, cowl and windshield, comprising a control chamber having a lower opening communicating with the engine chamber and having only one top opening; only one member oscillatably mounted in said control chamber adapted to close and open said openings and in the latter condition to direct warm air from the engine chamber over the cowl and against the windshield; and a handle on said member extending through a side wall of said control chamber for moving said member into positions to open and close said openings.

13. A defroster for vehicles having an engine chamber, cowl and windshield, comprising a control chamber having a lower opening communicating with the engine chamber and having only one top opening; only one member oscillatably mounted in said control chamber adapted to close and open said openings and in the latter condition to direct warm air from the engine chamber over the cowl and against the windshield; a handle on said member extending through a side wall of said control chamber for moving said member into positions to open and close said openings; and yielding means adapted to hold said member and handle in open and closed positions.

14. In a vehicle the combination of a cowl having a louvre opening and channel; an engine chamber; a windshield; a passenger compartment; a control chamber having a pair of bottom openings communicating with said engine chamber and said passenger compartment; a top cover with edges in said channels; and only one member in said control chamber adapted to align with one of the bottom openings and to engage and lift one side of the top cover to form a passage and direct warm air from the engine chamber against the windshield and to align with the other bottom opening and to lift the other side of the top cover to form a passage and direct exterior air downwardly through the control chamber into the passenger compartment.

15. In a combination ventilator and defroster for vehicles having an engine chamber, passenger compartment, and windshield, the combination of a control chamber having one top and two bottom openings; a duct for warm air leading from the engine chamber to the control chamber; only one top cover for the top opening; a spring for yieldingly holding the cover in open and closed positions; and only one member in said control chamber adapted to align with one of the bottom openings and to engage and lift one side of the top cover to form a passage and direct warm air from the engine chamber against the windshield and to align with the other bottom opening and to lift the other side of the top cover to form a passage and direct exterior air downwardly through the control chamber into the passenger compartment.

16. In a combination ventilator and defroster for use in vehicles having an engine chamber, passenger compartment, and windshield, the combination of a control chamber having one top and two bottom openings; only one top cover for the top opening having a double pivotal mounting; and only one movable member in the control chamber adapted to engage and lift one side of the top cover and to form a passage and direct warm air from the engine chamber upwardly against the windshield when tilted in one direction, and to lift the other side of the top cover and simultaneously form a passage for exterior air downwardly through the control chamber to the passenger compartment when tilted in the other direction.

17. In a combined defroster and ventilator for motor vehicles having an engine chamber and a passenger compartment, the combination of a control chamber having a plurality of openings; only one control member oscillatably mounted in said control chamber and adapted to cover and to clear said plurality of openings, having a plurality of positions, adapted in one position to direct exterior air into the passenger compartment for ventilation, and in the other position to direct interior heated air from the engine chamber outwardly for defrosting; and a screen carried by the control member adapted to prevent passage of undesirable matter into the control chamber in both the ventilating and defrosting positions.

18. A combination ventilator and defroster for vehicles having an engine chamber, windshield and a passenger compartment, comprising a control chamber having a pair of lower openings communicating respectively with the engine chamber and with the passenger compartment, and having only one top opening; and an oscillatable member in said compartment having a pair of openings therein, said oscillatable member being selectively movable to close both of said lower openings simultaneously, to align the pair of openings respectively with one of said lower openings and the top opening in the control chamber and to align the pair of openings respectively with the other of said lower openings and the top opening in the control chamber.

19. A combination ventilator and defroster for vehicles having an engine chamber, windshield, and a passenger compartment, comprising a control chamber having a pair of openings communicating with the passenger compartment and with the engine chamber; a pair of gates for conditioning said openings; spring means for normally urging said pair of gates to a closed position; only one top cover for said control chamber cooperating with said pair of gates to ventilate the compartment and to defrost the windshield; and links interconnecting and effecting coordinate movement between said gates and said top cover.

20. In a combination ventilator and defroster for use in vehicles having an engine chamber, passenger compartment, and windshield, the combination of a control chamber having one top and two bottom openings; only one top cover for the top opening having a double pivotal mounting; spring means for normally holding said top cover in a closed position; and only one movable member in the control chamber adapted to engage and lift one side of the top cover and to form a passage and direct warm air from the engine chamber upwardly against the windshield when tilted in one direction, and to lift the other side of the top cover and simultaneously form a passage for exterior air downwardly through the control chamber to the passenger compartment when tilted in the other direction.

JAMES MILFORD BURGESS.